United States Patent
Zahradnik et al.

[11] Patent Number: 6,026,917
[45] Date of Patent: Feb. 22, 2000

[54] EARTH-BORING BIT WITH IMPROVED BEARING SEAL

[75] Inventors: Anton F. Zahradnik, Sugarland; Eric C. Sullivan, Houston; Chih Lin, Spring; Terry J. Koltermann; Scott R. Schmidt, both of Woodlands, all of Tex.

[73] Assignee: Baker Hughes Incorporated, Houston, Tex.

[21] Appl. No.: 08/993,943

[22] Filed: Dec. 18, 1997

[51] Int. Cl.[7] .............................. F16J 15/34; F16C 33/72
[52] U.S. Cl. ...................... 175/371; 384/94; 277/336; 277/382; 277/390; 277/396
[58] Field of Search .................... 175/371, 372; 384/94; 277/336, 382, 390, 396

[56] References Cited

U.S. PATENT DOCUMENTS

| | | |
|---|---|---|
| 1,641,261 | 9/1927 | Fletcher . |
| 1,908,049 | 5/1933 | Reed . |
| 2,041,567 | 5/1936 | Green . |
| 2,107,788 | 2/1938 | Hall . |
| 3,762,485 | 10/1973 | Chesser et al. ............. 175/65 |
| 4,176,848 | 12/1979 | Lafuze ..................... 277/336 |
| 4,256,351 | 3/1981 | Langford, Jr. . |
| 4,428,687 | 1/1984 | Zahradnik . |
| 4,516,641 | 5/1985 | Burr ........................ 175/372 |
| 4,629,338 | 12/1986 | Ippolito . |
| 4,741,406 | 5/1988 | Deane et al. .............. 175/340 |
| 4,747,604 | 5/1988 | Nakamura . |
| 4,762,189 | 8/1988 | Tatum . |
| 4,784,231 | 11/1988 | Higgins ..................... 175/340 |
| 4,813,502 | 3/1989 | Dysart ....................... 175/337 |
| 4,848,476 | 7/1989 | Deane et al. .............. 175/340 |
| 5,005,989 | 4/1991 | Karlsson . |
| 5,009,519 | 4/1991 | Tatum ......................... 384/94 |
| 5,027,911 | 7/1991 | Dysart ....................... 175/371 |
| 5,080,183 | 1/1992 | Schumacher et al. ......... 175/371 |
| 5,096,005 | 3/1992 | Ivie et al. ................. 175/340 |
| 5,295,549 | 3/1994 | Dolezal et al. ............. 175/371 |
| 5,360,076 | 11/1994 | Kelly, Jr. et al. ......... 175/371 |
| 5,472,058 | 12/1995 | Hooper et al. . |
| 5,875,861 | 3/1999 | Daly et al. ................. 175/371 |
| 5,887,981 | 3/1999 | Slaughter, Jr. et al. ..... 175/371 |

*Primary Examiner*—David Bagnell
*Assistant Examiner*—Chi H. Kang
*Attorney, Agent, or Firm*—Felsman Bradley Vaden Gunter & Dillon, LLP; James E. Bradley

[57] ABSTRACT

An earth-boring bit has a bit body and at least one bearing shaft depending inwardly and downwardly from the bit body. The bearing shaft has a base where it joins the bit body. At least one cutter is mounted for rotation on the bearing shaft and has radial and axial surfaces that cooperate with the base of the bearing shaft to define a bearing seal gland. A bearing is defined between the cutter and bearing shaft. A seal element is disposed in the seal gland. A secondary seal is disposed in the seal gland opposite the cutter axial surface and cooperates with the seal element to at least partially seal the gland against entry of debris from the exterior of the bit.

20 Claims, 2 Drawing Sheets

EARTH-BORING BIT WITH IMPROVED BEARING SEAL

BACKGROUND OF THE INVENTION

1. Field of the Invention

The present invention relates in general to earth-boring bits, particularly to those having rotatable cutters in which seal assemblies retain lubricant within the bearing areas.

2. Background Information

One of the most successful seal means used in earth-boring bits of the type having rotatable cutters is the O-ring seal disclosed in commonly assigned U.S. Pat. No. 3,397,928, to Galle. The o-ring seal successfully confines lubricant to the bearing area while excluding detritus for long periods of time before failure.

A more recent seal development is the rigid or metal face seal. In the rigid face seal type, the seal interface is between one or two rigid, usually steel, seal rings. One or two elastomer o-rings serve to energize or urge the seal faces of the rigid ring or rings in contact with each other. The rigid face seal has proved to be as successful as the o-ring seal and provides an improved ability to accommodate pressure fluctuations in the bit lubricant.

A somewhat less successful design is the Belleville seal, in which elastomer elements are bonded to a rigid metallic ring or washer, which is placed under compression in the seal gland and the elastomer elements perform the bulk of the sealing.

All three types of seals are subject to the condition known as mud packing. This condition occurs when the solid matter in drilling fluid or mud is carried into the seal gland, where it adheres to gland and/or seal component surfaces and causes deformation and/or slippage of elastomeric seal components. Moreover, these particles can accelerate abrasive wear of all seal components.

A need exists for seal assemblies that supplement the main bearing seal by assisting in the prevention of entry of debris into the seal assembly itself.

SUMMARY OF THE INVENTION

It is a general object of the present invention to provide an earth-boring bit having an improved bearing seal that is more resistant to wear and provides improved sealing efficiency for longer periods in time.

This and other objects of the present invention are achieved by providing an earth-boring bit having a bit body and at least one bearing shaft depending inwardly and downwardly from the bit body. A bearing is defined between the cutter and bearing shaft. The bearing shaft has a base where it joins the bit body. At least one cutter is mounted for rotation on the bearing shaft and cooperates with the base of the bearing shaft to form a bearing seal gland. A seal element is disposed in the bearing seal gland. A secondary seal is disposed in the seal gland adjacent the base of the bearing shaft and cooperates with the seal element to at least partially seal the gland against entry of debris from the exterior of the bit.

According to the preferred embodiment of the present invention, the seal element is a rigid face seal, which includes at least one rigid seal ring and at least one resilient energizer ring, that seals against entry of debris into the bit bearing.

According to the preferred embodiment of the present invention, the secondary seal element is a continuous elastomeric ring disposed at the base of the bearing shaft.

According to the preferred embodiment of the present invention, the bit body includes a last-machined surface adjacent the base of the bearing shaft. The secondary seal element may be secured by adhesive to the last-machined surface and/or to the rigid seal ring.

According to the preferred embodiment of the present invention, the secondary seal element is a resilient ring in contact with a portion of the seal element.

DESCRIPTION OF THE PREFERRED EMBODIMENT

Figure 1:
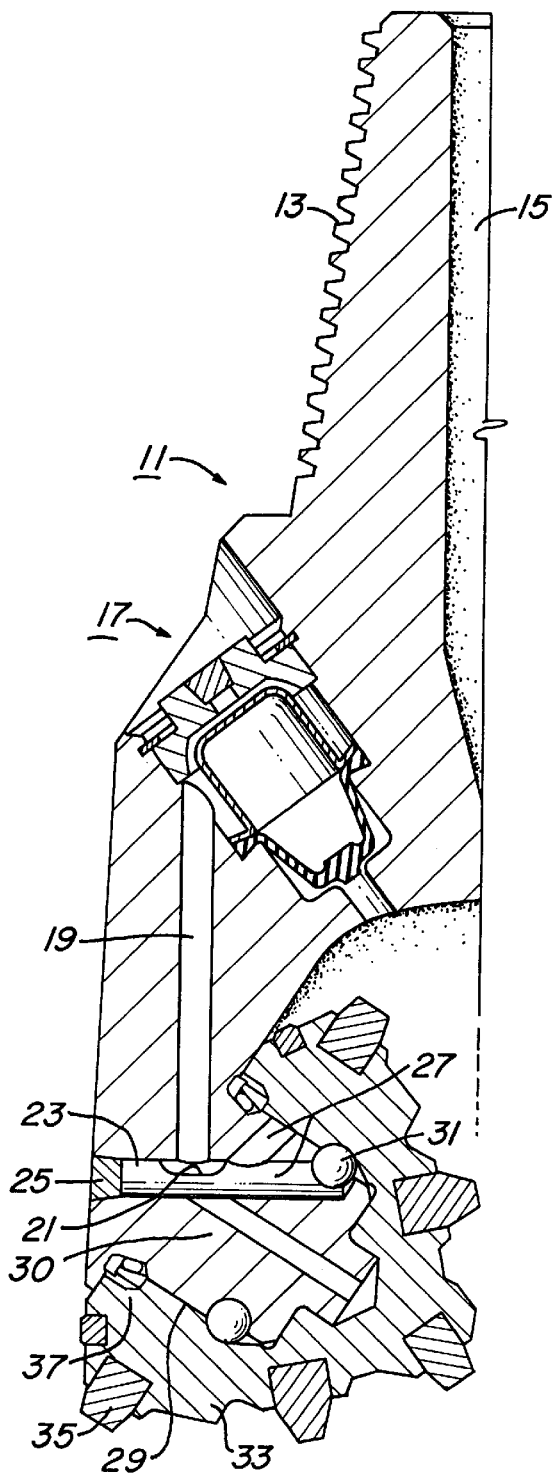
FIG. 1 is a longitudinal section view of one section of the bit body of an earth-boring bit according to the present invention.

The numeral 11 in FIG. 1 of the drawing designates an earth-boring bit having a threaded upper portion 13 for connection to a drill string member (not shown). A fluid passage 15 directs drilling fluid to a nozzle (not shown) that impinges drilling fluid or mud against the borehole bottom to flush cuttings to the surface of the earth.

A pressure-compensating lubrication system 17 is contained within each section of the body, there usually being three, which are welded together to form the composite body. The lubrication system is preferably similar to that shown in commonly assigned U.S. Pat. No. 4,727,942, to Galle.

In each section of the body, a lubricant passage 19 extends from each compensator 17 downwardly into intersection with another lubricant passage 21 in which a ball plug 23 is secured to the body by a plug weld 25. Lubricant passages 27 carry lubricant to a cylindrical journal bearing surface defined between a cylindrical insert 29 (interference fit in cutter 33) and a corresponding cylindrical surface on bearing shaft 30, which is cantilevered downwardly and inwardly from an outer and lower region of the body of the bit, commonly known as the shirttail.

Ball plug 23 retains a series of ball bearings 31 that rotatably secure cutter 33 to bearing shaft 30. Dispersed in the cutter are a plurality of rows of earth-disintegrating cutting elements or teeth 35 that may be constructed of a sintered tungsten carbide secured by interference fit into mating holes in cutter 33. A seal assembly 37, including a secondary seal according to the present invention, is disposed adjacent the base of bearing shaft 30 and seals lubricant within the bearing and debris out of the bearing.

Figure 2:
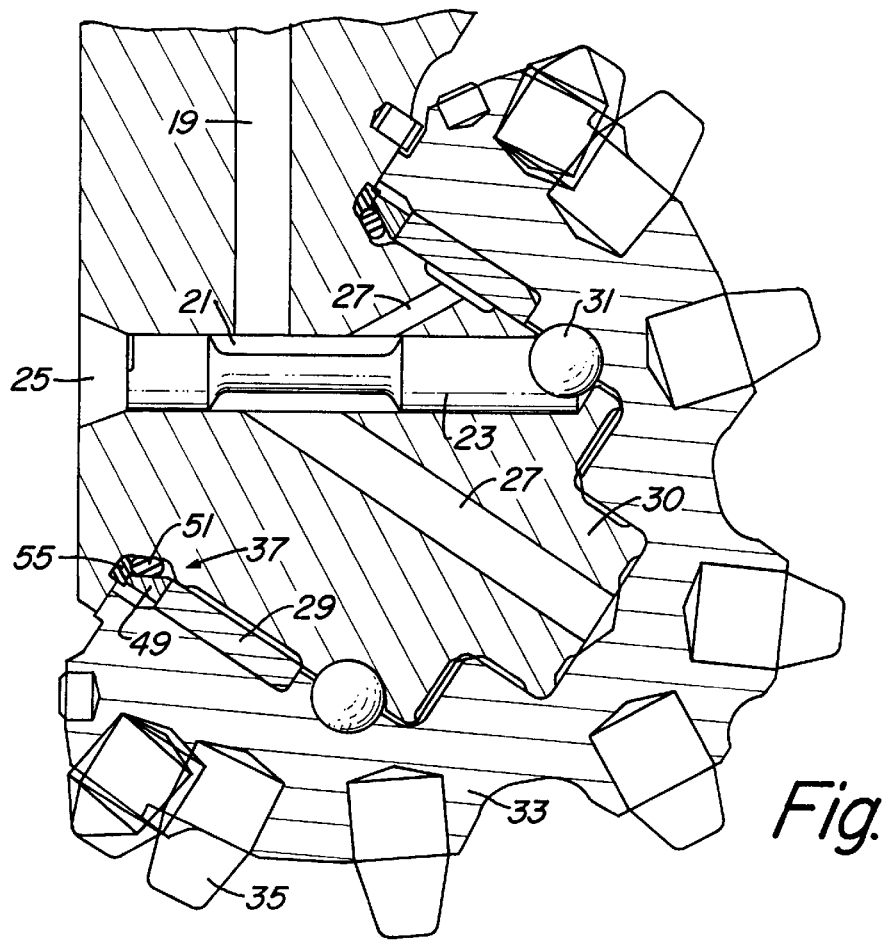
FIG. 2 is an enlarged, fragmentary longitudinal section view of the bearing shaft and seal according to the present invention.
Figure 3:
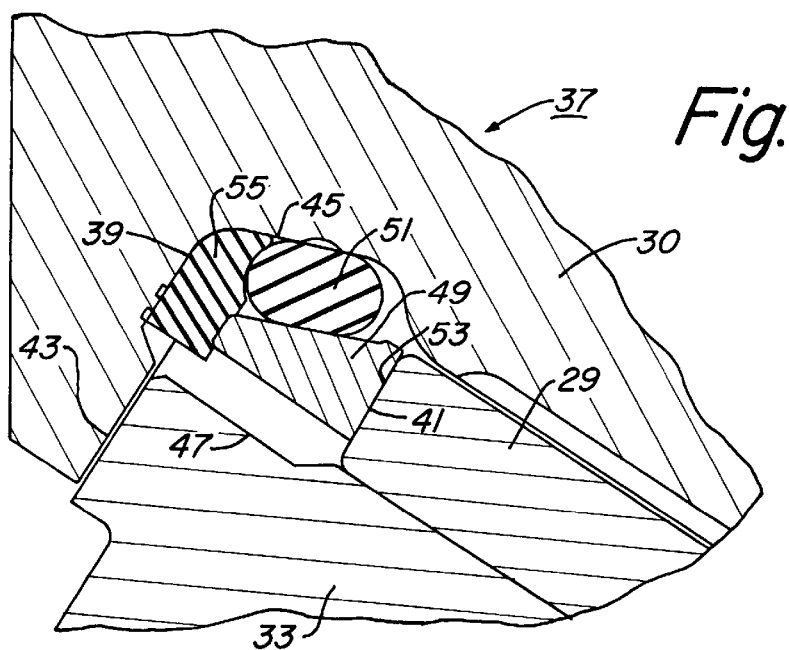
FIG. 3 is an enlarged, fragmentary section view of the seal assembly of FIG. 2.

FIGS. 2 and 3 are enlarged section views of the bearing and seal assembly of the earth-boring bit according to the present invention. A pair of axial surfaces 39, 41 formed in cutter 33 and last-machined surface 43 of the shirttail portion of the bit body cooperate with a pair of radial surfaces 45, 47 to define a bearing seal gland generally at the base of bearing shaft 30. A single-ring rigid or metal face seal 37 is disposed in the seal gland and includes a rigid seal ring 49 and an o-ring energizer 51, which urges a seal face 53 on ring 49 into sealing engagement with a corresponding seal face 41 on an insert 29 in cutter 33. This rigid face seal is formed in accordance with commonly assigned U.S. Pat. No. 4,753,304, to Kelly, which is incorporated herein by reference.

Seal assembly 37 may be regarded as a primary seal because it is designed to seal the journal bearing against entry of foreign material or debris and to accommodate pressure fluctuations in the lubricant. Seal 37 is also a dynamic seal because it seals the moving or dynamic interface between each cutter and its bearing shaft and the relative rotational movement between them.

In addition to dynamic seal 37, a secondary seal ring 55 is disposed in the seal gland opposite between seal assembly 37 and last-machined surface 43 to seal the seal gland and seal assembly 37 against entry of debris, particularly drilling mud particles, from the exterior of bit 11. To accommodate seal ring 55 and seal 37, axial surface 39 is in a groove machined into last-machined surface 43 to a depth approximately one-third to one-half the nominal axial thickness of ring 55. However, no groove is believed to be necessary and axial surface 39 may be flush with last-machined surface 47.

Figure 4:
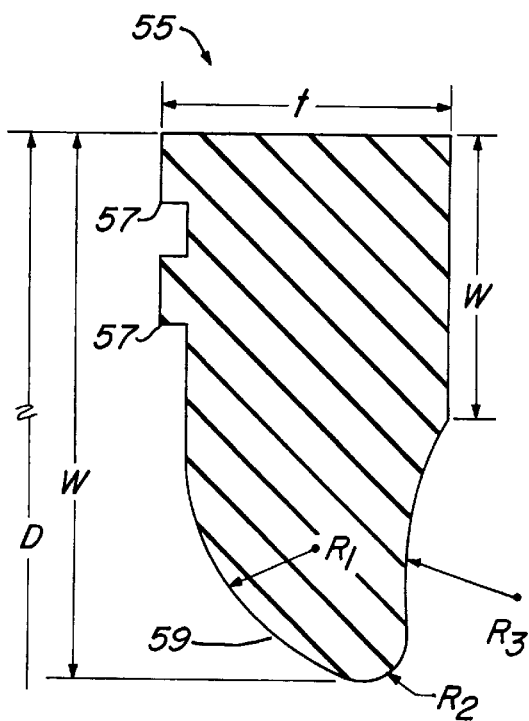
FIG. 4 is an enlarged, cross-sectional view of the secondary, static seal ring of FIG. 3 in a relaxed condition.

FIG. 4 is an enlarged cross-section view of ring 55 according to the present invention. Preferably, secondary seal ring 55 is a continuous ring formed of nitrile elastomer material of about 40–45 durometer (Shore A) and a modulus of about 100–200 psi/in/in. According to the preferred embodiment, no adhesive is used to secure ring 55 in the seal gland. Alternatively, secondary seal ring 55 may be attached or secured by adhesive to axial seal gland surface 39 (or last-machined surface 43) and to rigid seal ring 49 to enhance its sealing ability. Because secondary seal ring 55 remains stationary with last-machined surface 47 and does not seal relative rotary motion, it is a static seal, as opposed to seal 37, which is a dynamic seal.

According to the preferred embodiment of the present invention, for an 8½ inch bit, secondary seal ring 55 has an outer diameter D of approximately 2.480 inch and a radial width W of about 0.211 inch. Outer diameter D is selected to be about 0.040 to 0.060 inch larger than the outer diameter of rigid ring 49. The inner diameter and end 59 of secondary seal ring 55 are configured to be similar to and conform to radial surface 45 and axial surface 39 of the seal gland. A radius $R_1$ of about 0.085 inch and a tip radius $R_2$ of about 0.015 inch are provided at the inner end of secondary seal ring 55.

Ring 55 also includes two raised ribs 57 which are approximately 0.025 inch to 0.030 inch wide and 0.010 inch to 0.014 inch high. The purpose of the ribs is to form high-stress areas to deter the entry of fluid and/or debris into the seal gland when secondary seal ring 55 is forced into contact with surface 39.

Ring 55 has an axial thickness t of about 0.095 inch (in the uncompressed or relaxed state), which is greater than the gap formed between axial surface 39 and the end of seal ring 49. The intent is to provide sufficient "squeeze" on secondary seal ring 55 between axial surface 39 and seal ring 49. In the preferred embodiment, this squeeze is approximately 20% to 25% of the uncompressed or relaxed radial thickness t of ring 55 using nominal values and with the cutter forced outward on the bearing shaft. A radius $R_3$ of about 0.125 inch is provided to permit deformation of energizer ring 51 and to closely conform to it. The remaining width w of ring 55 is about 0.104 inch.

In the assembled configuration, the area in the seal gland bounded by surfaces 39 and 45, including rings 49, 51, and 55, is intended to be assembled so as to minimize or exclude air. Upon assembly, a continuous ring of heavy mineral oil is applied to at least axial surface 39, then secondary seal ring 55 is placed in the seal gland and energizer 51 and seal ring 49 are installed. This assembly process helps to insure that void areas are minimized and/or eliminated in the aforementioned area of the seal gland.

The invention has been described with reference to preferred embodiments thereof. It is thus not limited, but is susceptible to variation and modification without departing from the scope of the invention.

We claim:

1. An earth-boring bit having an improved bearing seal assembly, the earth-boring bit comprising:

a bit body;

at least one bearing shaft depending inwardly and downwardly from the bit body, the bearing shaft having a base where it joins the bit body;

a cutter mounted for rotation on each bearing shaft, the cutter including axial and radial surfaces that cooperate with the base of the bearing shaft to define a bearing seal gland, the axial surface of the cutter being in a plane substantially perpendicular to an axis of the bearing shaft, the radial surface being an annular surface concentric with the axis;

a dynamic primary seal element disposed in the seal gland, the primary seal element having a rigid seal ring that is in dynamic contact with the axial surface of the cutter and a resilient energizer disposed in the seal gland in contact with the rigid seal ring and the bearing shaft for urging the rigid seal ring against the axial surface of the cutter; and a static secondary seal element formed of resilient material and disposed in the seal gland at the base of the bearing shaft, the secondary and primary seal elements being free of relative motion therebetween and being free of contact with the radial surface of the cutter, and wherein the secondary seal element and the primary seal element cooperate to seal the gland against entry of matter and protect the energizer of the primary seal element from debris.

2. The earth-boring bit according to claim 1 wherein the secondary seal element contacts and seals against at least the rigid seal ring of the primary seal element.

3. The earth-boring bit according to claim 1 wherein the secondary seal element is a continuous elastomeric ring secured to the bit body at the base of the bearing shaft.

4. The earth-boring bit according to claim 1 wherein the bit body includes a last-machined surface adjacent the base of the bearing shaft and the secondary seal element is located adjacent to the last-machined surface.

5. The earth-boring bit according to claim 4 wherein a mineral oil is disposed between the last-machined surface and the secondary seal element for filling void space in the seal gland.

6. The earth-boring bit according to claim 1 wherein the secondary seal element is elastomeric, seals between the base of the bearing shaft and a portion of the rigid seal ring, and is in contact with a portion of the energizer.

7. The earth-boring bit according to claim 1 wherein the secondary seal element is a resilient ring secured to a portion of the primary seal element.

8. An earth-boring bit having an improved bearing seal assembly, the earth-boring bit comprising:

a bit body;

at least one bearing shaft depending inwardly and downwardly from the bit body, the bearing shaft having a base where it joins the bit body;

a cutter mounted for rotation on each bearing shaft, the cutter including axial and radial seal surfaces that cooperate with the base of the bearing shaft to define a bearing seal gland, the axis surface of the cutter being in a plane substantially perpendicular to an axis of the bearing shaft, the radial surface being an annular surface concentric with the axis;

a primary seal element disposed in the seal gland, the primary seal element including a rigid seal member and a resilient member for urging the rigid seal member into sealing contact with a sealing surface; and a resilient, elastomeric, secondary seal element disposed in the seal gland between the base of the bearing shaft and the primary seal, wherein the secondary seal element and the primary seal element cooperate to jointly protect the resilient member from debris and seal the seal gland against entry of debris.

9. The earth-boring bit according to claim 8 wherein the primary seal element and the secondary seal element are free of contact with the radial seal surface of the cutter.

10. The earth-boring bit according to claim 8 wherein the secondary seal element contacts and seals against both the rigid seal member and the resilient member of the primary seal element.

11. The earth-boring bit according to claim 8 wherein the secondary seal element is a continuous elastomeric ring secured to the bit body at the base of the bearing shaft.

12. The earth-boring bit according to claim 8 wherein the bit body includes a last-machined surface adjacent the base of the bearing shaft and the secondary seal element is located adjacent to the last-machined surface.

13. The earth-boring bit according to claim 12, wherein a mineral oil is disposed between the last-machined surface and the secondary seal element for filling void space in the seal gland.

14. The earth-boring bit according to claim 8 wherein the secondary seal element comprises at least one elastomeric material.

15. The earth-boring bit according to claim 8 wherein the secondary seal element is a resilient ring secured to the rigid seal member of the primary seal element.

16. An earth-boring bit having an improved bearing seal assembly, the earth-boring bit comprising:

a bit body;

at least one bearing shaft depending inwardly and downwardly from the bit body, the bearing shaft having a base and a last-machined surface where it joins the bit body;

a cutter mounted for rotation on each bearing shaft, the cutter including radial and axial seal surfaces that cooperate with the base of the bearing shaft to define a bearing seal gland, the axial surface of the cutter being in a plane substantially perpendicular to an axis of the bearing shaft, the radial surface being an annular surface concentric with the axis;

a primary seal element disposed in the seal gland, the primary seal element including at least one rigid seal ring and at least one resilient energizer element between the bearing shaft and the rigid seal ring for urging the seal ring into sealing engagement with the axial seal surface of the cutter;

a resilient, elastomeric secondary seal element disposed in the seal gland opposite the axial seal surface of the cutter in stationary contact with the last machined surface, the secondary seal element contacting and sealing against both the rigid seal ring and the energizer element of the primary seal element, and wherein the secondary seal element and the primary seal element cooperate to protect the energizer element from debris and seal the gland against entry of debris; and wherein the primary and secondary seal elements are free of contact with the radial seal surface of the cutter.

17. The earth-boring bit according to claim 16 wherein the secondary seal element is a continuous ring secured to the bit body at the base of the bearing shaft.

18. The earth-boring bit according to claim 16 wherein the secondary seal element is secured to the last-machined surface;

wherein the secondary seal element is a resilient ring secured to a portion of the primary seal element.

19. The earth-boring bit according to claim 18 wherein a mineral oil is disposed between the last-machined surface and the secondary seal element for filling void space in the seal gland.

20. The earth-boring bit according to claim 16 wherein the secondary seal element is an resilient ring secured to the rigid seal ring of the primary seal element.

* * * * *